P. A. TESSIER.
POULTRY FOUNTAIN.
APPLICATION FILED MAY 24, 1915.
1,181,045.
Patented Apr. 25, 1916.
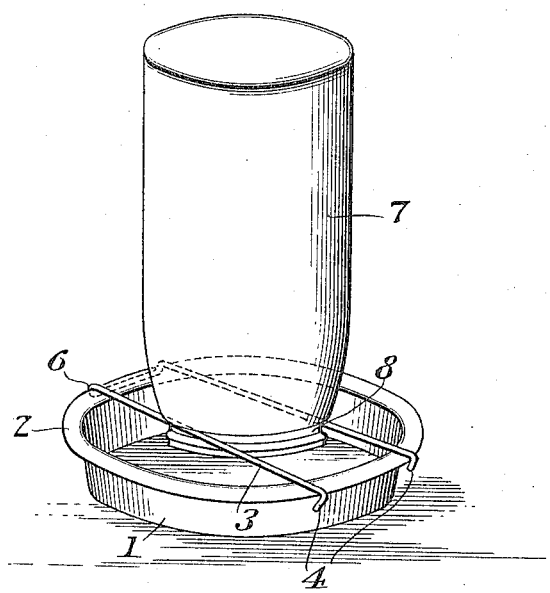
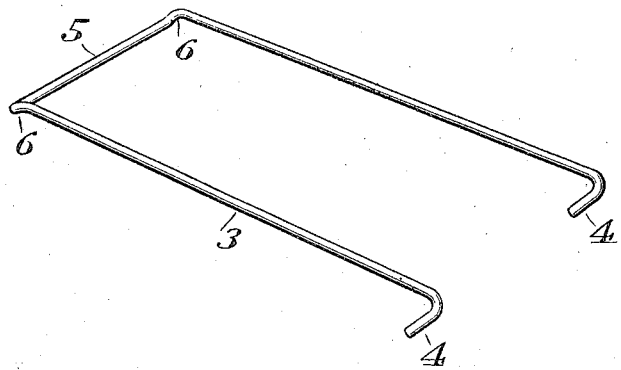
Witnesses
M. E. Laughlin
Inventor
Philip A. Tessier
By Victor J. Evans
Attorney
THE COLUMBIA PLANOGRAPH CO., WASHINGTON, D. C.

UNITED STATES PATENT OFFICE.

PHILIP A. TESSIER, OF IRVINGTON, NEW JERSEY.

POULTRY-FOUNTAIN.

1,181,045.

Specification of Letters Patent.

Patented Apr. 25, 1916.

Application filed May 24, 1915. Serial No. 30,094.

*To all whom it may concern:*

Be it known that I, PHILIP A. TESSIER, a citizen of the United States, residing at Irvington, in the county of Essex and State of New Jersey, have invented new and useful Improvements in Poultry-Fountains, of which the following is a specification.

This invention relates to poultry fountains and it consists in the novel features hereinafter described and claimed.

An object of the invention is to provide a fountain of the character indicated which is simple and of durable structural arrangement, having its parts brought together in a manner whereby they may be readily separated for cleansing and other purposes.

With the above object in view the fountain includes a pan provided with an outstanding edge portion and a yoke adapted to engage the pan and adapted to support an inverted jar. The jar contains a volume of water which flows from the jar into the pan and when the level of the water is at the lower edge of the mouth of the jar, the flow of water from the jar ceases but as the water in the pan is consumed, the water from the jar flows in a downward direction and maintains a constant level in the pan. The jar is shiftable upon the yoke whereby more space for drinking may be provided at one side portion of the pan than at the other, or a larger space may be provided at one side than at the other. When the chicks are young and but little space is necessary, the jar may be positioned approximately at the center of the pan, thereby affording room all around the jar for the chicks to drink. As the chicks grow the jar may be positioned eccentrically with relation to the pan or nearer one side thereof than at the other whereby more space is left at one side of the jar than at the other, consequently the larger chicks may readily reach the water and partake of the same.

In the accompanying drawing: Figure 1 is a perspective view of the fountain. Fig. 2 is a perspective view of the yoke of the fountain.

The fountain comprises a pan 1 which is provided at its upper edge with an outstanding rim 2. The pan 1 is preferably circular in form although this specific shape is not absolutely essential. A wire yoke 3 is disposed transversely across the upper edge of the pan 1 and the rim 2 thereof. The said yoke is approximately U-shaped in plan and is provided at its ends with hooks 4 adapted to engage under the rim 2 at one side portion of the pan. The intermediate portion 5 of the yoke 3 is depressed with relation to the end portions thereof, thereby forming notches 6 adapted to engage around the outer edge of the rim 2 at the opposite side of the pan 1 from that side which is engaged by the hooks 4. The opposite side portions of the yoke 3 are approximately parallel with each other and the said portions when the yoke is in position upon the rim 2 are spaced above the bottom of the pan 1. A jar 7 of any desired pattern is supported upon the yoke 3 and the said jar is provided in the vicinity of its mouth with an annular depression 8 which receives the intermediate portions of the end parts of the yoke 3 whereby the jar 7 is held against movement transversely of the yoke. However, the jar 7 may be readily moved longitudinally of the yoke in order that the jar may be positioned at any desired point above the bottom of the pan 1.

In operation the jar 7 is supplied with a volume of water and the end portions of the yoke 3 are spread. The jar 7 is then turned to an inverted position over the pan 1 and the mouth portion of the jar is inserted between the end portions of the yoke 3 and the said portions of the yoke are received in the depression 8 of the jar. Thus the jar is held above the bottom of the pan 1. The water from the jar flows down out of the same and into the pan until the level of the water in the pan is at, or slightly above, the lower edge of the jar. Then the water from the jar ceases to flow, but inasmuch as the pan 1 is of greater diameter than the jar, ample space is provided around the jar to permit the chicks to have access to the water and partake of the same. As hereinbefore stated, when the chicks are quite young the jar 7 may be positioned approximately above the center of the bottom of the pan. Thus space is left around the jar to permit the small chicks to have access to the water.

As the chicks develop, the jar 7 may be moved along the yoke to a point nearer one side of the pan 1 than the other, consequently more space is left at one side of the jar than at the other, and the growing chicks may have access to the water through the larger space.

From the above description taken in conjunction with the accompanying drawing it will be seen that a drinking fountain of extremely simple structure is provided and that the parts may be readily manipulated in order to accommodate the fountain for the use of chicks of different sizes. Furthermore, the parts may be readily separated from each other for the purpose of cleansing or for storage, and transportation.

Having described the invention what is claimed is:

1. A drinking fountain comprising a pan, a yoke mounted upon the edges of the pan, a jar mounted upon the yoke and movable along the same transversely of the edges of the pan.

2. A drinking fountain comprising a pan provided at its edge with an outstanding rim, a yoke mounted upon the rim and being approximately U-shaped in plan, said yoke being provided at its ends with hooks adapted to engage under the rim, the said yoke being further provided at its intermediate portion with notches adapted to engage the edge of the rim and a jar mounted upon the end portions of the yoke and adjustable thereon, transversely of the edge of the pan.

In testimony whereof I affix my signature in presence of two witnesses.

PHILIP A. TESSIER.

Witnesses:
M. E. LAUGHLIN,
GEO. A. BYRNE.

Copies of this patent may be obtained for five cents each, by addressing the "Commissioner of Patents, Washington, D. C."